Figure 1:
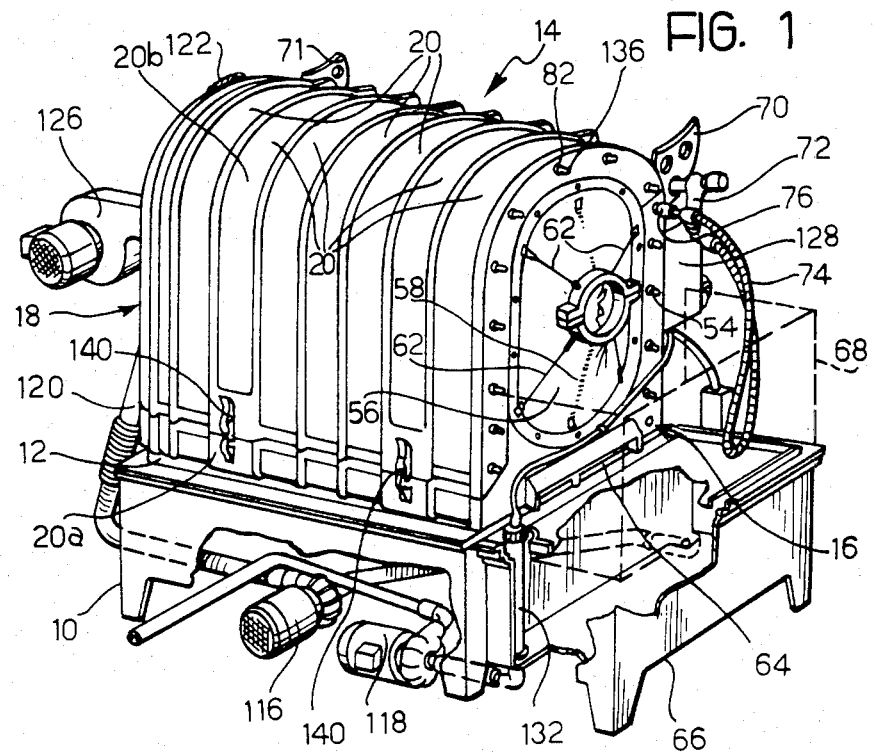

United States Patent [19]

Altissimo

[11] Patent Number: 4,505,229

[45] Date of Patent: Mar. 19, 1985

[54] AUTOMATIC WASHING MACHINE FOR DOGS AND LIKE ANIMALS

[76] Inventor: Mario Altissimo, Via Bologna 220, Torino, Italy

[21] Appl. No.: 558,494

[22] Filed: Dec. 6, 1983

[30] Foreign Application Priority Data

Dec. 10, 1982 [IT] Italy .............................. 54051/82[U]

[51] Int. Cl.³ .............................................. A01K 13/00
[52] U.S. Cl. .................................................... 119/158
[58] Field of Search ................... 119/158, 159, 160, 1, 119/15

[56] References Cited

U.S. PATENT DOCUMENTS

| | | | |
|---|---|---|---|
| 3,867,906 | 2/1975 | Johnson | 119/158 |
| 3,884,191 | 5/1975 | Stout | 119/158 |
| 4,020,796 | 5/1977 | Grifa | 119/158 |
| 4,056,078 | 11/1977 | Blafford et al. | 119/158 |
| 4,057,032 | 11/1977 | Dimitriadis | 119/158 |
| 4,083,328 | 4/1978 | Baker | 119/158 |
| 4,382,424 | 5/1983 | Altissimo | 119/158 |
| 4,407,234 | 10/1983 | Kleman | 119/158 |

*Primary Examiner*—Gene Mancene
*Assistant Examiner*—Kris R. Schulze
*Attorney, Agent, or Firm*—McCormick, Paulding & Huber

[57] ABSTRACT

An automatic washing machine for dogs and like animals comprises a rigid, generally cylindrical casing with a flat bottom and two ends of which one has an aperture for the head of the animal. The casing, which is provided internally with a plurality of spray nozzles connected to washing means and drying means, is formed between the two ends by an axial series of contiguous annular modular elements connected together axially, each of which has a double wall defining an interspace divided into a plurality of first and second separate axial passages connected respectively to the washing means and the drying means and communicating with the spray nozzles.

21 Claims, 7 Drawing Figures

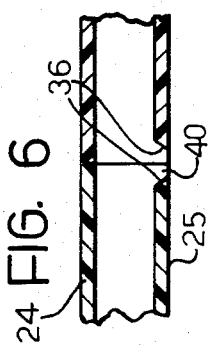
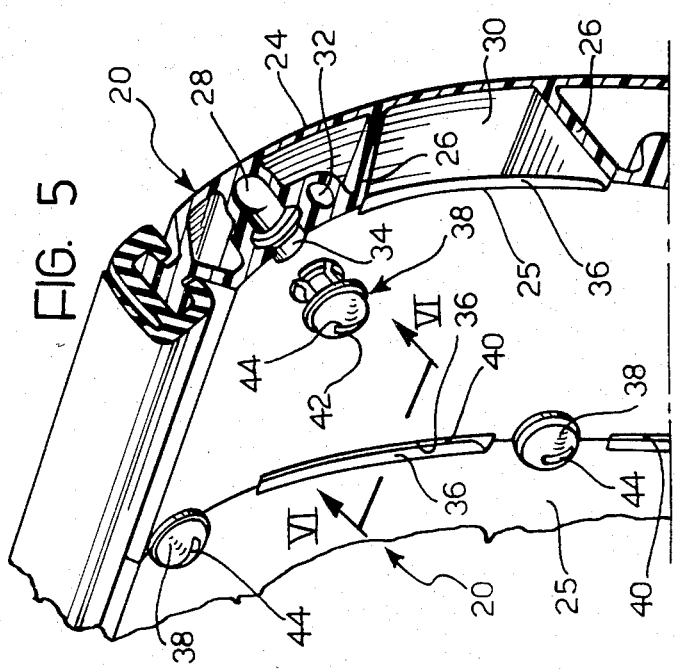
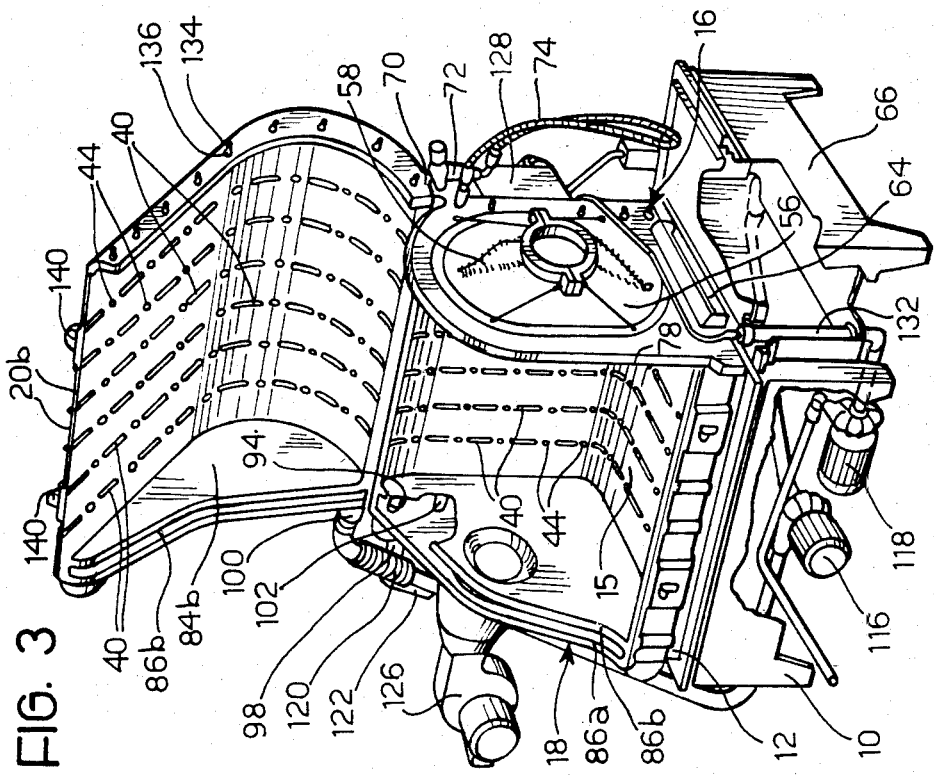

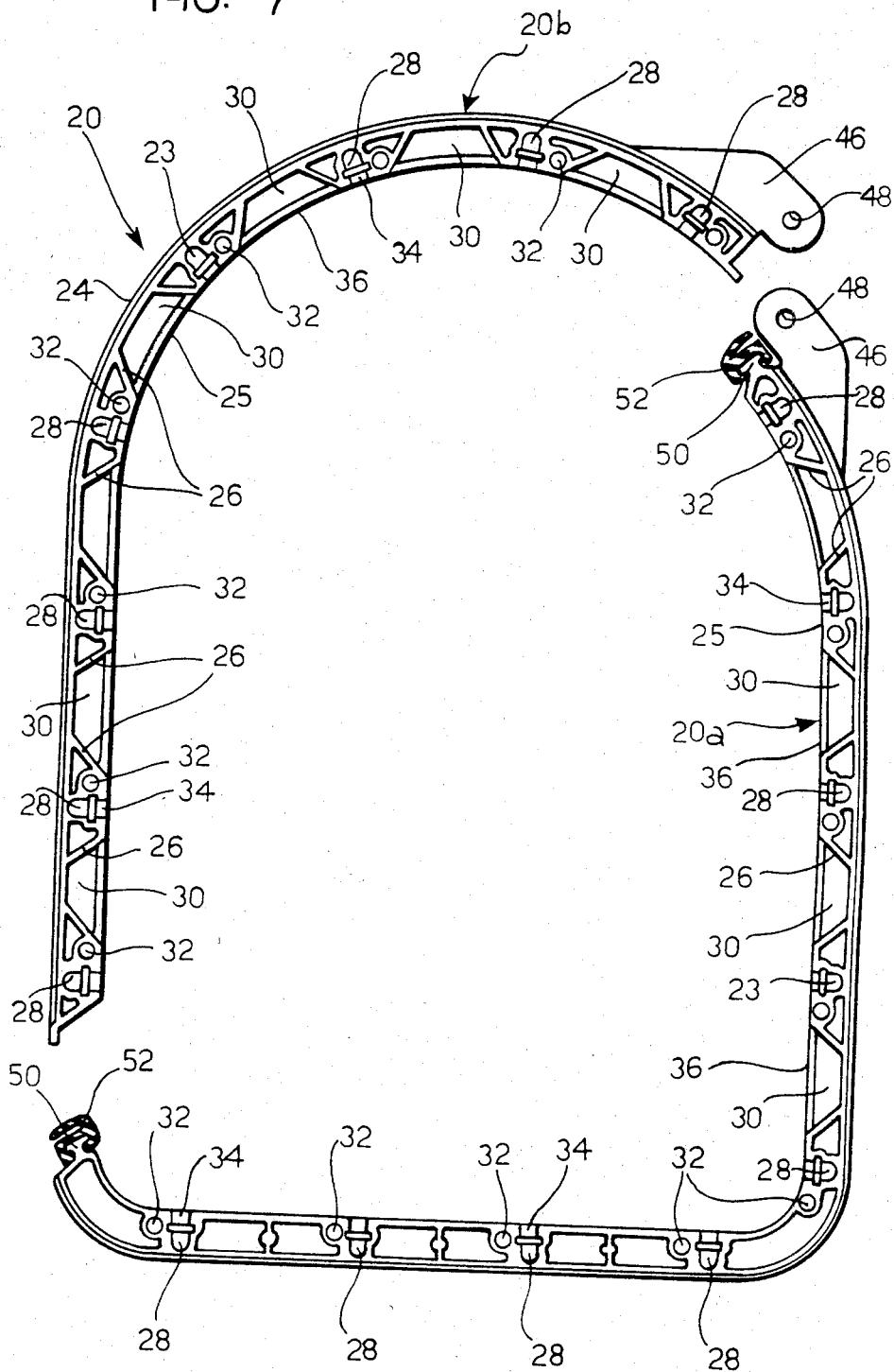

AUTOMATIC WASHING MACHINE FOR DOGS AND LIKE ANIMALS

The present invention relates to an automatic washing machine for dogs and like animals, comprising:

a rigid, generally cylindrical casing with a substantially horizontal axis, having a flat bottom and two ends of which one has an aperture for the head of the animal placed in the casing in use, the casing having an openable part to allow the admission and escape of the animal and being provided internally with a plurality of inwardly-facing spray nozzles, washing means for supplying water or a mixture of water and detergent to the nozzles under pressure, drying means for supplying pressurized hot air to the nozzles, and a central programming and control unit for controlling the washing and drying operations of the washing and drying means in a predetermined operating cycle.

Automatic washing machines of this type are described and illustrated, for example, in EPA NO. 0 034 123 and in U.S. Pat. No. 3,884,191 and U.S. Pat. No. 4,056,078.

The washing machines described in these documents have the general disadvantage of being rather complicated and expensive to manufacture, which in practice has prevented them from being produced industrially and used commercially on a large scale.

On the other hand, it must be borne in mind that the animals for which these machines are intended have a wide range of sizes and that the washing machines must obviously have correspondingly different dimensions, since it is clear that a casing suitable for a small dog may not be used for washing large dogs and vice versa. The conformation of washing machines proposed until now does not allow this problem to be resolved effectively, since they cannot be adapted to animals of different sizes except by providing the purchaser with machines of different dimensions, with a clear additional increase in the production and retail costs.

The object of the present invention is to avoid these disadvantages and to provide an automatic dog washing machine of the type defined at the beginning, which is simpler and more economical to manufacture and, in particular, is so arranged as to be readily adapted to animals of different sizes.

According to the invention, this object is achieved by virtue of the fact that the casing of the machine is formed, between the two ends, by an axial series of contiguous annular modular elements connected together axially, each of the annular modular elements having a double wall defining an interspace divided into a plurality of first and second separate axial passages communicating with the corresponding axial passages of the adjacent elements, the first and second passages being connected respectively to the washing means and the drying means and communicating with the nozzles.

By virtue of this characteristic, a considerable simplification is achieved from a production point of view in that the annular modular elements may easily be made in large numbers using plastics materials and conventional moulding techniques, and from the point of view of adaptability of the machine to animals of different sizes in that this can clearly be achieved simply by varying the number of the modular annular elements which make up the casing.

The possibility of adapting the machine to animals of different sizes is a considerable advantage not only for the producer but also for the user, since the change in the dimensions of the casing may be carried out relatively easily and rapidly immediately before use of the machine, as necessary.

In order to facilitate these modifications, according to the invention, the annular modular elements have a plurality of third axial passages in which are engaged tie rod connecting members with screw-threaded ends which project from the two ends and are provided with nuts for clamping the annular modular elements together.

Thus, the addition or removal of annular elements is achieved simply by manipulation of the clamping nuts of the tie rods.

Figure 2:
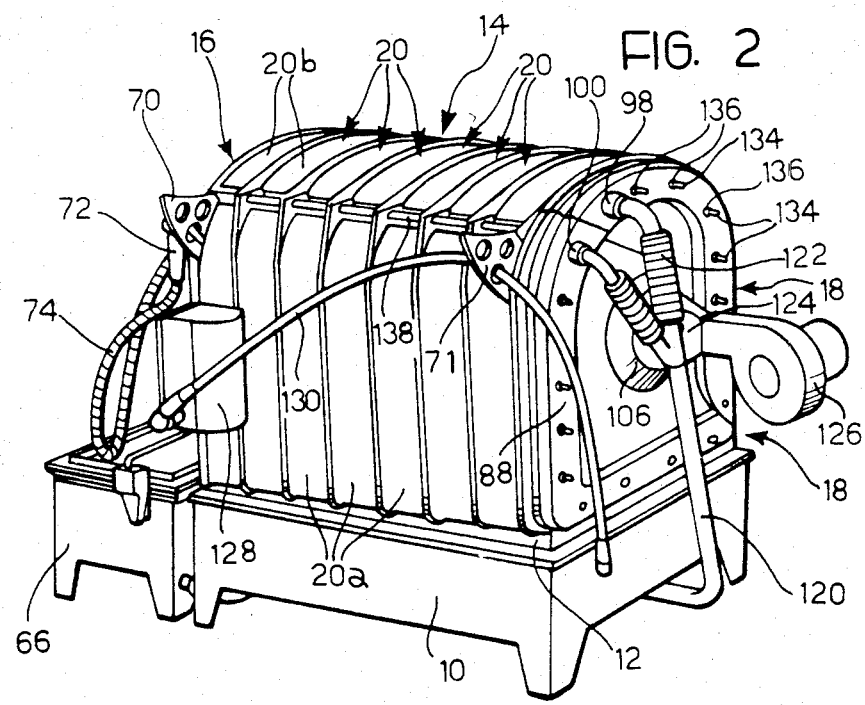
Figure 4:
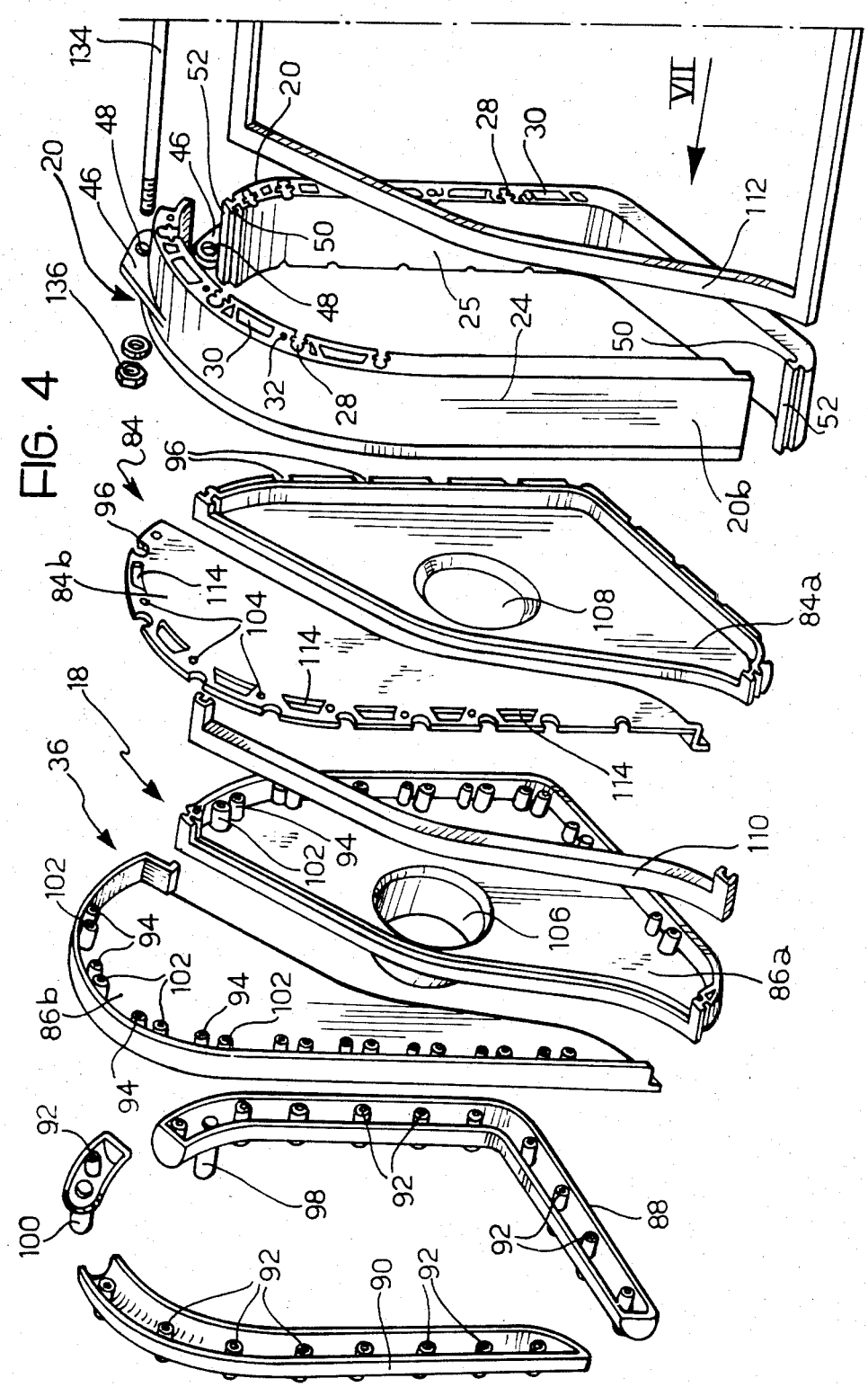

Further characteristics and advantages of the invention will become clear during the course of the detailed description which follows with reference to the appended drawings, provided purely by way of non-limiting example, in which:

FIG. 1 is a partially sectioned perspective view of a washing machine according to the invention, FIG. 2 is a view similar to FIG. 1 but rotated through 180° relative thereto, FIG. 3 is a view similar to FIG. 1 with the casing of the machine in an open position, FIG. 4 is an exploded perspective view of part of the casing on an enlarged scale, FIG. 5 is a sectioned perspective view of a detail of the casing on an enlarged scale, FIG. 6 is a cross-sectional view taken on the line VI—VI of FIG. 5, and FIG. 7 is a front elevational view taken on arrow VII of FIG. 4.

Referring initially to FIGS. 1 to 3, the washing machine according to the invention comprises essentially a support base 10 having an inclined upper surface 12 on which rests a casing 14 of moulded plastics material with a generally cylindrical shape, having its axis parallel to the inclined rest surface 12 and a flat bottom 15.

The casing 14 is formed by a front end 16, a rear end, generally indicated 18, and an axial series of annular modular intermediate elements 20.

As illustrated in greater detail in FIGS. 4 to 7, each of the annular modular elements 20 comprises, in effect, two portions 20a, 20b of which the first, fixed to the base 10, is generally L-shaped with limbs which define respective parts of one side and the bottom 15 of the casing 14, and the second has a generally open C-shape with arms defining parts of the other side and the top of the casing 14.

The two portions 20a, 20b have a certain axial length, usually of the order of 15–20 cm, and a double wall structure with an outer wall 24 and an inner wall 25 respectively, interconnected by intermediate septa, generally indicated 26. Thus, in practice, the walls 24 and 25 define an interspace which is divided by the septa 26 into a plurality of first axial passages 28 in the form of cylindrical ducts, second axial passages 30 of larger, generally trapezoidal section, and third axial passages 32 of a form similar to that of the first passages 28. The axial passages 28, 30 and 32 of each element 20 communicate with the corresponding axial passages 28, 30 and 32 of the contiguous elements 20.

As is better illustrated in FIG. 5, in the ends of the inner wall 25 of the two parts 20a, 20b of each element 20 there are formed a plurality of substantially semicircular apertures 34 and a plurality of elongate outwardly-facing notches 36, which open into the first axial passages 28 and into the second axial passages 30, respectively. It should be noted that, in the example illustrated, there are no notches 36 in the limb of the part 20a corresponding to the bottom 15 of the casing; however, these notches 36 could alternatively be provided in this zone as well.

The semicircular apertures 34 and the notches 36 of each element 20 define, together with the corresponding apertures 34 and notches 36 of the adjacent elements 20, holes for receiving inserts 38 and slots 40 respectively. Each insert 38, which is preferably snap-engaged in its respective receiving aperture 34, is tubular and has a respective substantially hemispherical head 42 which faces inwardly of the casing 14 and has an elongate slot 44 constituting a spray nozzle for a washing liquid. The slots 40, as illustrated in FIG. 6, may narrow in section inwardly of the casing 14 and constitute blowing nozzles for drying air.

Returning again to FIGS. 4 and 7, the outer walls 24 of the parts 20a and 20b of each annular element 20 have respective outer lugs 46 provided at one end with articulation holes 48 the function of which will be clarified below. Furthermore, anchoring parts 50 are formed at the ends of the part 20a of each element 20, in correspondence with which lipped sealing washers 52 are fitted for bearing sealingly against the corresponding ends of the part 20b.

The front end 16 of the casing 14 is constituted by an annular element having a periphery corresponding to that of the elements 20 and, in the corresponding zones to the parts 20a of these elements 20, having axial through-holes 54 aligned with the third passages 32. The aperture of the end 16 is closed hermetically by means of a sheet of impermeable flexible material 56 having a central vertical aperture to which is attached a double zip fastener 58. This fastener 58 allows an aperture to be formed in the end 16 which is adjustable vertically for the passage of the head of the animal to be washed. A collar 60 is associated with this aperture and is supported from the periphery of the head 16 by adjustable tie rods 62, the function of which is to clamp the neck of the animal.

A horizontal elongate aperture 64 is formed beneath the flexible sheet 56 in the front end 16, which communicates with the interior of the casing 14 and overlies a collecting tank 66 the upper part of which carries a removable cover 68 for surrounding the zone corresponding to the head of the animal, in use. Furthermore, on one side of the front end 16 is an attachment 70 for releasably receiving a sprayer with a handle 72 connected by means of a hose 74 to a tubular connector 76 communicating, through a hole in the end 16, with one of the first axial passages 28 of the annular elements 20.

In the closed condition of the casing 14 illustrated in FIGS. 1 and 2, the peripheral part of the front end 16 without holes 54 is covered, with the interposition of a lipped sealing washer 78, by a flange part 80 having axial through-holes 82 and connected rigidly, in the manner described below, to the parts 20b of the annular element 20.

Referring now to FIGS. 3 and 4, the rear end 18 is constituted by a pair of spaced-apart plate elements 84, 86 having a periphery identical to that of the elements 20 and each of which is constituted, like the elements 20, by two parts 84a, 84b and 86a, 86b respectively.

To the outer face of the two parts 86a, 86b of the element 86 are fitted two channel-sectioned manifolds 88, 90 having respective tubular projections 92 aligned with respective tubular projections 94 formed on the inner face of the parts 86a, 86b of the element 86 and communicating, in their turn, through corresponding apertures 96 formed in the parts 84a, 84b of the element 84, with the third axial passages 32 of the elements 20.

In the upper zone of the two manifolds 88, 90 are formed two tubular connectors 98, 100 communicating with a series of tubular projections 102 formed on the inner faces of the parts 86a, 86b of the element 86 and communicating, in their turn, through axial holes 104 in the parts 84a, 84b of the element 84, with the first axial passages 28 of the elements 20.

Furthermore, a central aperture 106 is formed in the part 86a of the element 86 and communicates with the interspace between the two elements 84, 86, into which faces a projection 108 acting as a diffuser formed on the part 84a of the element 84.

In the closed condition of the casing 14 illustrated in FIGS. 1 and 2, the parts 84b, 86b of the elements 84, 86 are in sealing contact with the corresponding parts 84a, 86a, with the interposition of lipped sealing washers 110, 112. Thus, the interspace between the two elements 84 and 86 is sealed from the exterior. This interspace communicates through apertures 114 formed in the parts 84a, 84b of the element 84 with the second passages 30 in the elements 20.

The bottom of the tank 66 is connected on the one hand to an electric supply pump 116 and on the other hand to an electric discharge pump 118. In its turn, the electric supply pump 116 is connected, through a tube 120 and a partially flexible tube 122 which branches from the tube 120, to two tubular connectors 98 and 100, respectively, of the two manifolds 88 and 90.

The delivery duct 124 of an electric fan 126 provided in known manner with air heating means is attached to the aperture 106 of the element 86. Although in the example illustrated the pump 116 and the electric fan 126 are provided with independent motors, it should be noted that a single motor could be provided for driving the pump and the fan separately.

The machine according to the invention is also provided with a control unit, generally indicated 128, including, among other things, a solenoid valve for the supply of the washing liquid to the tank 66 through a flexible tube 130 intended to be connected to a water supply, and possibly a programmable timer. The control unit 128 is also connected to the output of a pressostat 132 inserted in the tank 66, and is arranged to control the supply solenoid valve, the pumps 116 and 118, and the fan 126 in a partially or completely automatic manner to carry out a predetermined operating cycle.

The structure of the casing 14 described above, and particularly the shape of the annular modular elements 20, allows the machine according to the invention to be adapted to animals of different sizes. This adaptation is achieved by the simple modification of the dimensions of the casing 14 by the addition or the removal of modular elements 20. This operation may be carried out extremely quickly and easily since the assembly of the casing 14 is achieved simply by means of a series of axial tie rods 134 which pass through the third axial passages 32 in the elements 20, and the ends of which project from the ends 16, 18 respectively through the holes 54, 82 of the end 16 and the flange 80, and through the apertures 96 of the element 84, the tubular projections 94 of the element 86, and the tubular projections 94 of the manifolds 88, 90 of the rear end 18. The tie rods 134 have screw-threaded ends onto which are screwed clamping nuts 136 by means of which the necessary clamping together of the components of the casing 14 is effected. A rod 138 is inserted through the holes 48 in the lugs 46 of the elements 20 and similar members (not shown) of the elements 84, 86, and constitutes a hinge pin between the parts 20a, 20b of the elements 20 and 84a, 84b and 86a 86b of the rear end 18. This allows the casing 14 to be opened to the position of FIG. 3 from the closed position of FIGS. 1 and 2 by means of the simple raising of the movable parts 20b, 84b and 86b, to allow easy access of the animal to the casing itself and to facilitate the positioning of the head of the animal through the aperture 58 in the front end 16.

In the open position, the movable parts 20b, 84b and 86b bear against the support 70 and against a similar support 71 provided in correspondence with the rear end 18.

In the closed condition, the cavity within the casing 14 is completely sealed from the exterior, and the movable parts 20b, 84b and 86b are locked together by a pair of simple external locking levers 140.

In operation, the machine normally effects a series of successive steps: pre-washing, washing, rinsing and drying, respectively.

During the pre-washing, washing and rinsing steps, the water from the tube 130 reaches the tank 66 and, after possible mixing with a detergent, is fed through the tubes 120, 122 by the pump 118 to the two tubular connectors 98 and 100. The liquid is then distributed to the two manifolds 88, 90 and, passing through the tubular projections 94 of the element 84 to reach the holes 104 in the element 84 and the first axial passages 28 in the elements 20, to the spray nozzles 44. The washing liquid is thus supplied under pressure through these nozzles into the casing 14, against the body of the animal to be washed.

The liquid expelled from the nozzles 44 collects on the bottom 15 of the casing 14 and, by virtue of the slope of the rest surface 12, is discharged back into the tank 66 through the aperture 64 in the end 16.

At the end of the pre-washing and washing phases, the liquid is discharged from the tank 66 by means of the pump 118, and rinsing is effected by clean water passed into the tank 66 through the tube 130.

After the final rinsing water has been discharged by the pump 118, the electric fan 126 is operated to dry the animal. The electric fan 126 directs heated air under pressure into the space between the elements 86 and 84 of the end 18 through the aperture 106. The flow of air impinges on the diffuser 108 and is deflected radially, reaching the nozzle slots 40 through the apertures 114 in the element 84 and the second axial passages 30 in the annular element 20.

At the end of the drying operation, the casing 14 is opened by raising the parts 20b, 84b and 86b so as to allow the animal to escape.

Naturally, the scope of the present invention extends to embodiments which achieve equal utility by using the same innovative concept.

I claim:

1. An automatic washing machine for animals, such as dogs and the like, comprising:
    a rigid, generally cylindrical casing having a substantially horizontal axis in its position of use, said casing including a flat bottom, two ends of which one defines an aperture for the head of an animal placed in the casing in use, and an openable part for allowing the admission and escape of the animal;
    a plurality of inwardly-facing spray nozzles in said casing;
    washing means for supplying a washing liquid to the nozzles under pressure;
    drying means for supplying pressurized air to the nozzles, and
    a central programming and control unit for controlling the washing and drying operations of the washing and drying means in a predetermined operating cycle,
    wherein the improvement comprises said casing being formed, between the two ends, by an axial series of contiguous annular modular elements connected together axially, each of said annular elements having a double wall defining an interspace divided into a plurality of first and second separate axial passages which communicate with the corresponding axial passages of the adjacent annular elements, and said first and second passages being connected respectively to said washing means and said drying means and communicating with said nozzles whereby the length of the casing may be altered by the addition or removal of one or more of the annular modular elements.

2. A washing machine as defined in claim 1, wherein the interspaces of said modular elements are further divided into a plurality of third axial passages, and tie rod connecting members are engaged in said third passages, said connecting members having screw-threaded ends which project from the two ends of casing and nuts being mountable on the threaded ends to clamp the annular elements together.

3. A washing machine as defined in claim 1, wherein said nozzles are disposed in correspondence with the facing ends of the adjacent modular annular elements.

4. A washing machine as defined in claim 3, wherein the facing ends of the inner walls of adjacent annular elements define respective semi-circular apertures which cooperate to form holes, and each of said nozzles with which said first axial passages communicate is constituted by a tubular insert which defines a spray aperture and is inserted in a respective said hole.

5. A washing machine as defined in claim 4, wherein said spray apertures have flattened sections.

6. A washing machine as defined in claim 4, wherein said inserts are snap-engageable in their respective holes.

7. A washing machine as defined in claim 3, wherein each of said nozzles with which said second axial passages communicate is constituted by an elongate slot, each slot being defined by facing notches formed in the corresponding ends of the inner walls of the contiguous annular elements.

8. A washing machine as defined in claim 7, wherein said slots narrow inwardly of the casing.

9. A washing machine as defined in claim 1, wherein each of said modular annular elements is constituted by a first fixed portion which defines part of one side and the bottom of the casing, and a second portion which defines part of the other side and the top of the casing and is hinged at one end to said first portion about an axis parallel to the axis of the casing for pivoting between a lowered sealingly closed position and a raised open position of the casing to allow the admission and escape of the animal, retaining means being provided for locking said second portions of the annular elements relative to said first portions in the closed position.

10. A washing machine as defined in claim 9, wherein said first and second portions of the annular elements have respective outer lugs adjacent their hinged ends, a common hinge pin passing through said lugs.

11. A washing machine as defined in claim 1, wherein one of said ends of the casing is formed by an annular element with a periphery similar to that of the modular annular elements, and a flexible impermeable sheet mounted in the centre of said annular element, said sheet having a double sliding-clasp fastener disposed vertically to define said aperture for the head of the animal.

12. A washing machine as defined in claim 11, wherein collar means are associated with said aperture and are fixed to said end to surround the neck of the animal in use.

13. A washing machine as defined in claim 11, wherein said other end of the casing comprises inner and outer plate elements which have peripheries identical to those of said annular modular elements and are spaced from each other so as to define an interspace communicating with said second axial passages, and wherein ducts extend through said interspace to communicate with said first axial passages of the annular elements, each said outer element having a first inlet opening into the interspace and connected to said drying means and second inlets communicating with said ducts and connected to said washing means.

14. A washing machine as defined in claim 13, wherein each plate element is formed by two separate portions connected respectively to said first and second portions of the annular elements, each portion of said outer plate element having an outer tubular manifold communicating with one of said second inlets and with said ducts.

15. A washing machine as defined in claim 13, wherein said inner plate element has a diffuser-shaped projection facing said first inlet of the outer plate element.

16. A washing machine as defined in claim 1, wherein it further includes a support base on which said casing rests in a position inclined towards said end provided with the aperture for the head of the animal, and a collecting tank associated with said base, and wherein said end defines a discharge aperture in its lower part beneath which the collecting tank is located.

17. A washing machine as defined in claim 16, wherein said collecting tank has a removable cover member defining a zone in correspondence with the head of the animal, and wherein a sprayer is located at said end of the casing, said sprayer including a handle and a hose connected to said handle and communicating with one of said first axial passages.

18. A washing machine as defined in claim 16, wherein said washing means include an electric pump connected to the bottom of said tank and means for supplying a washing liquid to said tank.

19. A washing machine as defined in claim 1, wherein said drying means comprise an electric fan.

20. A washing machine as defined in claim 1, wherein the washing means include an electric pump and the drying means comprise an electric fan and wherein said pump and said fan are driven by a common motor.

21. A washing machine as defined in claim 1, wherein the two ends and the annular modular elements are of moulded plastics material.

* * * * *